Nov. 29, 1960 P. TENENBAUM 2,962,295
VARIABLE POSITION RUNNING GEAR FOR TRACTOR HAULED TRAILERS
Filed June 18, 1958 4 Sheets-Sheet 1
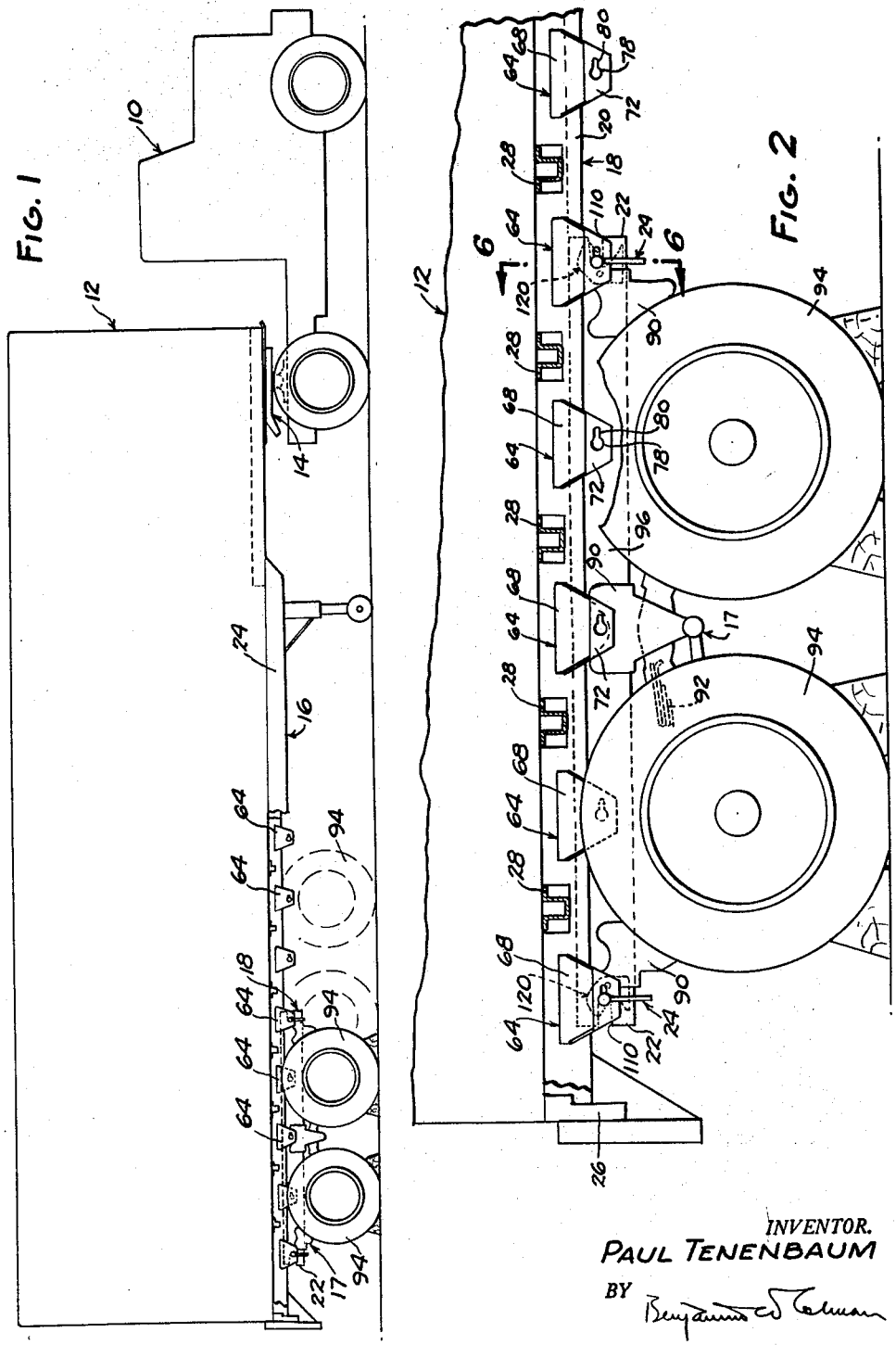
INVENTOR.
PAUL TENENBAUM
BY
ATTORNEY Nov. 29, 1960 P. TENENBAUM 2,962,295
VARIABLE POSITION RUNNING GEAR FOR TRACTOR HAULED TRAILERS
Filed June 18, 1958 4 Sheets-Sheet 2
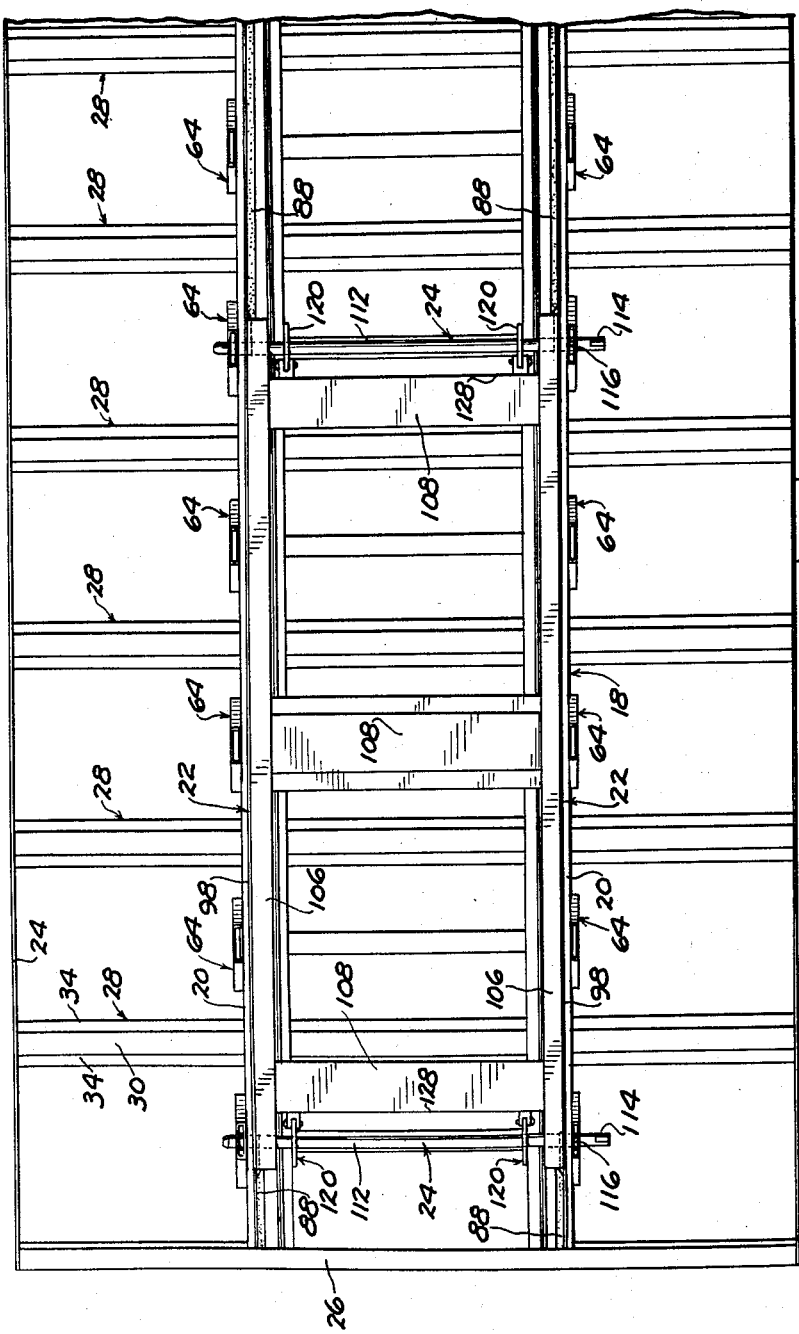
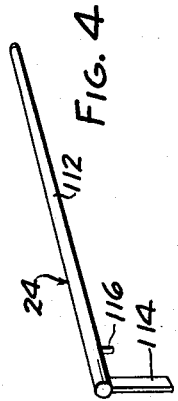
INVENTOR.
PAUL TENENBAUM
ATTORNEY

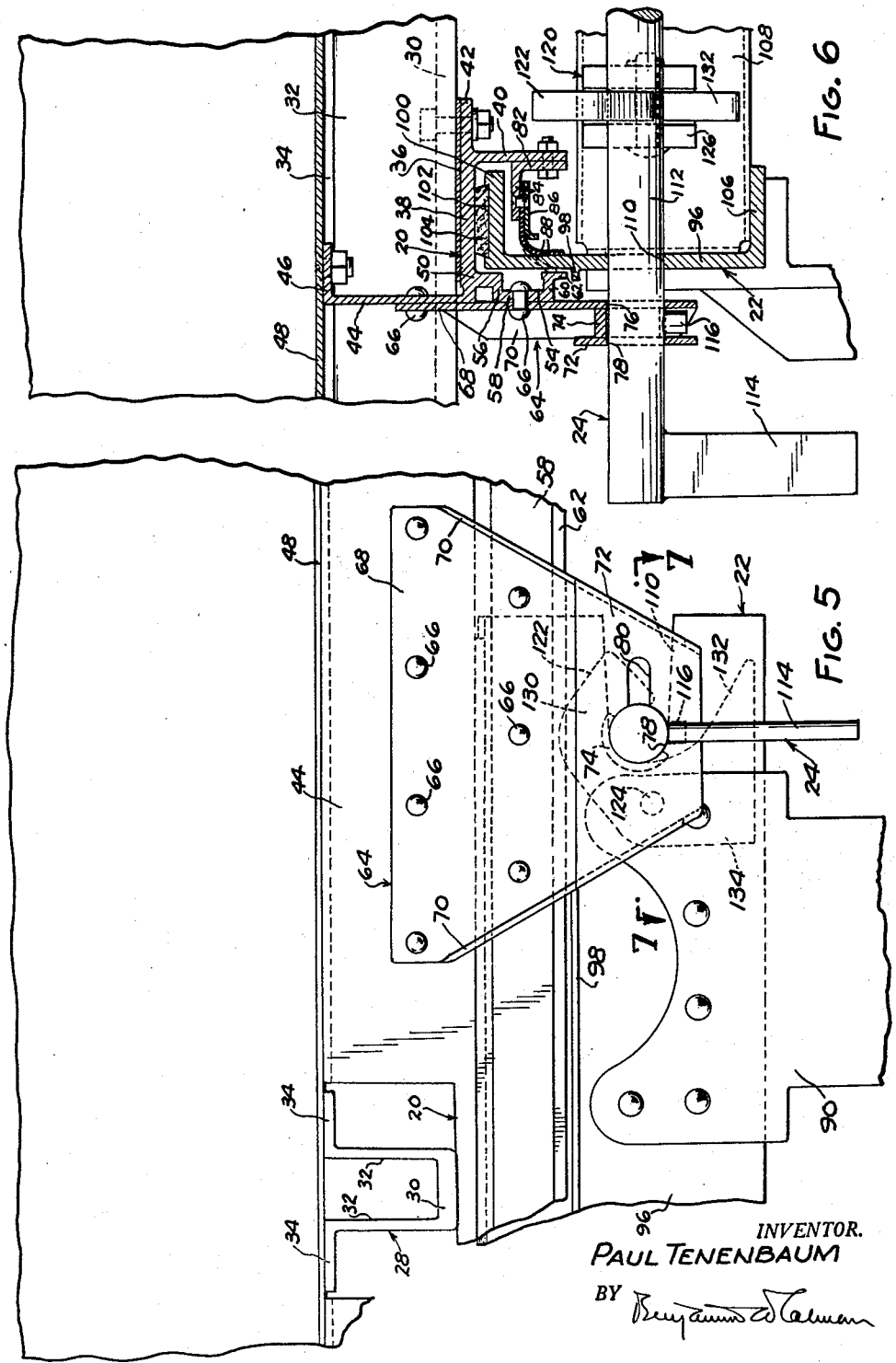

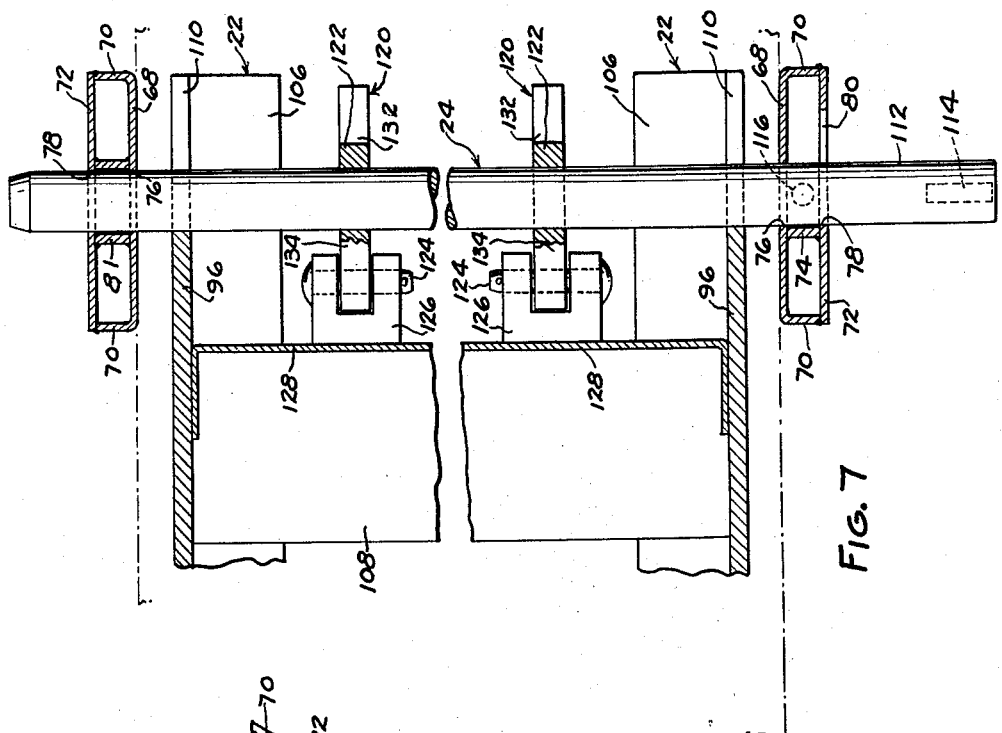
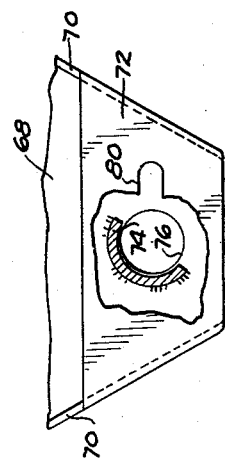

United States Patent Office 2,962,295
Patented Nov. 29, 1960

2,962,295

VARIABLE POSITION RUNNING GEAR FOR TRACTOR HAULED TRAILERS

Paul Tenenbaum, Oak Park, Mich., assignor to Copco Trailer Division, a division of Copco Steel & Engineering Company, Detroit, Mich., a corporation of Michigan Filed June 18, 1958, Ser. No. 742,881

7 Claims. (Cl. 280—81)

This invention relates to a construction in tractor hauled trailers by which the running gear of the trailer is easily shiftable to varying positions of support for the trailer load by means of a novel and inventive structural arrangement.

Trailers of the type here involved are loaded in a variety of ways often at a number of pick up stations, so that when the trailer is ready for intercity or intra-city hauling, very frequently the running gear is offset forwardly or rearwardly with respect to its most effective and efficient point of load support. When the trailer is more heavily loaded toward the front thereof, the running gear should be shifted forwardly; and when the load is concentrated at the rear end of the trailer, the running gear more properly is positioned toward the rear end. Even during hauling trips of the freight trailer, the support point may shift, as for instance when a heavier load is removed from the rear end of the trailer and the center of gravity of the loaded structure remaining shifts forwardly.

To solve this problem, various constructions have been used to permit shifting of the running gear. Some of the principal limitations of these constructions include the exposure of bearing surfaces to road dirt and grime with consequent corrosion and "freezing" of the members so that shifting the running gear is found to be impossible after a short term on the road. Another limitation involves the mechanics and mechanism for shifting heretofore employed which have proven unsatisfactory due to their complexity or to a lack of attention to driver needs or inefficiency. The instant invention is designed to solve the problem of facile shifting of the running gear, and sealing protection of the bearing surfaces of the mechanism is provided for in the structure.

The invention involves a construction comprising a sliding member secured to the running gear arranged to slide longitudinally of the trailer within the compass of complementary trailer affixed members so that the bearing surfaces are protected from road generated corrosion and maintained in operating condition at all times. The construction further provides for spaced anchorage secured to the trailer affixed members on the exterior sides thereof, providing means for engagement of the sliding members upon shifting the running gear to new forward or rearward positions. The structure further provides for an arrangement whereby the bearing track is enclosed longitudinally and transversely, and is protected from roadbed dirt, grime and other deleterious matter.

It is an object of the invention to provide a shiftable running gear for a tractor hauled trailer whereby the gear may be secured in a number of positions longitudinally of the trailer for more efficient support thereof. Another object is to provide a construction in which the running gear is secured to a sliding unit, bearing in a track fixedly secured to the framing of the trailer and forming a part thereof. A further object is to provide positioning anchorage for the running gear in spaced apart members conjoined to the fixed track. Yet another object is to provide a construction in which the bearing track is provided with longitudinally extending encompassing elements for protection thereof from roadbed dirt and grime in any position at which the running gear sliding unit functions.

These and additional objects of the invention and features of construction will become more readily apparent from the description of the invention given below, and in which the terms are used for purposes of description and not of limitation.

Reference is here made to the drawings annexed hereto and made a part hereof, and in which Fig. 1 is a side elevational view of a trailer and tractor combination embodying the inventive construction.

Fig. 2 is an enlarged fragmentary side elevational view of the area of the trailer embodying the inventive construction, showing the running gear in engaged position.

Fig. 3 is a bottom plan view, on the scale of Fig. 2, showing the sliding unit for the running gear in position in the fixed track.

Fig. 4 is a perspective view of one of the locking bars employed in the inventive construction.

Fig. 5 is an enlarged fragmentary side elevational view of the anchorage structure secured to the fixed track.

Fig. 6 is a fragmentary vertical sectional view taken substantially on the line 6—6 of Fig. 2.

Fig. 7 is a fragmentary horizontal sectional view taken substantially on the line 7—7 of Fig. 5.

Fig. 8 is a fragmentary side elevational view, partially in section, of a portion of one of the anchorage elements.

As shown in the several views of the drawings, and particularly in Figs. 1 and 2, the trailer hauling tractor 10 and trailer 12 are engaged at the fifth wheel structure 14 according to conventional practice. Although the trailer 12 may be of the van type, as shown, it may also take the form of an open top trailer, flat bed trailer, or other suitable configuration. The trailer framing 16 is of conventional construction, as is the axle, spring and wheel assembly 17, generally called the running gear.

Secured to and made a part of the trailer framing is the inventive sliding construction 18, comprising a pair of fixed track members 20 spaced apart from each other on either side of a median line extending longitudinally of the trailer 12, a pair of sliding channel members 22 disposed to bear upon and within the track members 20, and a pair of removable locking bars 24 engageable with the members 20 and 22 to lock them together into fixed position.

Trailer framing 16 comprises generally side members 24, end members 26 arranged transversely and normal to the trailer side members, and a series of spaced apart, transverse, parallel framing ribs 28, all conjoined together to form a substantially rigid uniplanar frame for the superstructure and the running gear 17. The ribs 28 are preferably, but not necessarily, of the "hat" section configuration shown in Fig. 5, wherein a channel web 30 having upstanding legs 32 is provided with outwardly extending flanges 34 integrally formed with and at the edges of the legs and normal thereto.

The longitudinally extending track members 20 are secured to the rearward framing end member 26 and to the transverse ribs 28, as shown in Fig. 3, spaced apart from each other in parallel on either side of a median line lengthwise of the trailer 12. Each of the track members 20 comprises a channel portion 36 having an integrally formed web 38, a depending leg 40 inwardly of the web 38, a side flange 42 which may be in the plane of web 38, as shown, or otherwise to provide a means for securing the track channel portion 36 to the transverse rib channel 30, an upstanding flange 44 outwardly of web 38 having an inturned flange 46 secured to the trailer flooring 48 and serving as a support therefor, and a depending leg 50 substantially in the plane of the upstanding flange 44 and parallel to the first depending leg 40.

The upstanding flange 44 is designed to provide its inturned flange 46 in the plane of the transverse rib flanges 34, so that flooring 48 can be placed upon them and lie supported in a single plane. The flange 44 further is designed to lie between the transverse ribs 28.

The depending leg 50 of the track 20 is provided with a side channel or ribs 52, forming a longitudinally extending pocket or space 54 provided by the upper outwardly extending leg 56, the downwardly depending web 58, and the inwardly projecting leg 60. At the inner edge of leg 60 is a flange portion 62 parallel to the web 58 and depending from the leg 60.

At spaced intervals extending from the front end to the rear end of the tracks 20 and outwardly thereof on each side of the trailer are secured a number of aligned parallel anchor members 64 suitably secured by fastening means such as rivets 66 or bolts, to the track flanges 44 and 50. The anchor members 64 each comprise a plate portion 68, side stiffening flanges 70, a front plate 72, and a locking bar stop 74 secured to plates 68 and 72 therebetween adjacent the openings 76 and 78 in each of the plates, respectively. Adjacent the opening 78 in the outer front plate 72 and communicating therewith is a slot 80 disposed substantially horizontal. The bar stop 74 is semi-circular in configuration and lies adjacent the openings 76 and 78. At the opposite side of the trailer, the outer front plate 72 is not provided with a slot 80, and the bar stop 81 is fully annular and is secured by welding between the outer and inner plates 72 and 68 of the anchor members 64.

Inwardly of the track channel leg 40 and secured thereto for the length thereof is an angle 82 having a leg 84 projecting horizontally toward the track leg 50. Secured to the leg 84 by suitable fastening means and a metal strip 86 is a flexible, resilient strip of weather sealing material 88, made preferably but not necessarily of rubber, vinyl, polyethylene or similar materials which are highly resistant to abrasion by roadbed grit, as well as to the metals with which it is in intimate contact.

The running gear 17 comprises generally a set of spring hangers 90, springs 92 of conventional form and construction, axles (not shown) properly secured to the springs and wheels 94, on each side of the trailer 12.

The spring hangers 90 on each side of the trailer are secured by bolts, rivets or other suitable fastening means to the sliding channel members 22. The latter members comprise a vertically disposed web 96 having an outwardly projecting rib or ridge 98, an upper horizontal leg 100 provided with a longitudinally extending slot 102 to provide a seat for a suitable bearing block 104 disposed between the leg 100 and the track channel web 38, and a lower horizontal inwardly projecting leg 106. The bearing block 104 may be made from a suitable plastic material such as Bakelite or Teflon, or a bearing bronze, or other similar anti-friction materials. As shown particularly in Figs. 3 and 7, the two principal sliding channel members 22 are secured into a sliding unit by transverse cross members 108, whereby a structurally rigid rectangular frame is created for the running gear 17.

The sliding channels 22 are disposed within the compass of the track channel portion 36 so that the web rib 98 lies adjacent to and just below the track flange portion 62; the flexible resilient weather sealing strip 88 bears against and makes substantial contact with the inner surface of sliding channel web 96; and the upper leg 100 of channel 22 lies between the track web 38 and the angle leg 84. In this way the sliding bearing surfaces of the channel web 38 and the bearing block 104 are fully protected from such roadbed grime, dirt and other deleterious matter as may be thrown upwardly. The rib 98 from the outside and the flexible strip 88 from the inside protect the sliding bearing surfaces, providing a simple and positive construction whereby the sliding of the running gear is maintained at high efficiency and effectiveness at all times.

At each end of the sliding channels 22 in the web 96 are slotted openings 110 arranged for alignment with the openings 76 and 78 of the anchor members fixedly secured at spaced intervals on the track members 20.

The locking bars 24 comprise a bar portion 112, a handle 114 and a retaining pin 116 positioned in the bar portion 112 adjacent to and spaced from the handle 114. The locking bar portion 112 is designed to pass through, in a close slip fit, the anchor openings 76 and 78 and the channel web slotted openings 110, which are slightly tapering outwardly.

Mounted on each of the transverse slide cross-members 108, at the forward and rearward ends of the sliding unit, are a pair of clamping latches 120 comprising a latch member 122 pivotally mounted by a pin 124 in a bracket support 126 fixedly secured, preferably by welding, to the vertical element 128 of the cross-member 108. The latch member 122 comprises a hook portion 130 and a throat 132 formed from the latch body 134.

In operation, as shown particularly in Figs. 1–3 inclusive, the sliding unit is anchored by a pair of locking bars 24 to the fixed track members 20 by passing the bar portions 112 through the anchor openings 76 and 78, the slotted channel web openings 110 and the latches 122 under the hook portions 130 thereof, at the front end and the rearward end of the sliding unit. The longitudinal distance between the slotted openings 110 in the sliding channels 22 is the exact distance between a certain specified number of anchor members 64 at their openings 76, 78. As shown in the drawings this number of anchor members is five; however, the number may be greater or lesser depending upon whether one or two axle assemblies are involved and the relative length of a particular running gear.

To shift the running gear sliding unit from one position to another longitudinally of the trailer, the two locking bars 24 are removed by rotating each of the bar portions 112 so that the retaining pin 116 is aligned with the slotted opening 80 in the anchor front plate 72, and withdrawing the bar axially from the several members and their openings to which reference was made above. When the bars 24 are removed, or just prior thereto, the wheels 94 should be blocked so that they will remain in position as the trailer superstructure slides forward or rearward with respect to the sliding unit.

To provide automatic engagement at a predetermined position of shift, one locking bar 24 is placed at a selected pair of aligned anchor members 64 either forward or rearward of the sliding unit. The wheels 94 being blocked into a fixed position on the base plane, the trailer superstructure is shifted by means of the tractor 10 so that the tracks 20 slide upon the bearing blocks 104, and the locking bar, in position across an aligned pair of anchor members 64, moves toward and into engagement with the latching hooks 130, which pass over the periphery of the bar portion 112 until they drop upon it at the throat 132 of the latch member 122. The sliding channel web end opening slots 110 pass over the locking bar portion 112 until the latter is seated fully in the throat of the slots, whereby sliding action of the trailer comes to a positive stop, and the sliding running gear unit and the trailer superstructure become positively engaged.

It will be noted that the flexible resilient weather sealing strip 88, extending the entire length of track 20, has its outboard edge bearing upon the channel web 96 at all times, the strip 88 bearing upon the track flange 62 both before and after the web 96, as shown clearly in both solid and broken lines in Fig. 6. Thus the track web 38 is maintained free of dirt and grime from the roadbed by the weather sealing strip 88 for the entire length of the track 20.

Once the first locking bar 24 has been engaged by the sliding unit, the second locking bar is placed through the anchor member openings 76 and 78, at the opposite end of the sliding unit, transversely of the trailer between the tracks 20. The locking bar pins 116 are passed through the anchor plate slots 80 and the handles rotated downwardly, securely engaging the locking bars 24 in place with practically no chance of losing the bars while the trailer is in transit.

Stop members (not shown) transversely of the track members 20, or in their plane between the channel portion legs 40 and 50, closing them off at their forward and rearward ends, are secured in place to the framing 16 of the trailer and to the track members 20 to prevent the trailer from being run off of the running gear sliding unit should an operator forget to position a locking bar 24 properly or at all, or to move the trailer superstructure in the wrong direction once the wheels 94 are blocked.

It will of course be clearly understood by persons skilled in the art to which the invention pertains that a single axle running gear may be employed in the inventive construction, as well as the tandem axle gear shown and described.

Having described the invention in its simplest terms, it is to be clearly understood that the features of construction may be changed and varied in greater or lesser degree without departing from the essence of the invention.

I claim:

1. In a load carrying vehicle having a floor framing, a pair of longitudinally extending spaced apart parallel track members affixed and secured to said framing on the underside thereof and each having a pair of spaced legs depending therefrom to form a channel, each of said track members having a longitudinally extending leg projecting above said channel into the plane of said floor framing and secured thereto, a series of longitudinally spaced anchor members secured to each of said first-mentioned members on the outer sides thereof, each of said anchor members having a portion depending vertically below the lower edges of said channel legs, an auxiliary frame for the running gear of said vehicle having a pair of spaced apart longitudinally extending parallel channels slidable within said framing affixed channel members, each of said slidable channels having the web thereof arranged vertically and one of its legs in sliding engagement with said framing affixed channel, said slidable channel web having a rib projecting laterally therefrom to a position overlapping the outer of said track member channel legs from below, a resilient flexible sealing strip disposed under said framing affixed channel member for the entire length thereof and under said slidable channel leg where disposed in said first channel member to seal the same against admission of foreign substances from without, said strip making closure contact with said slidable channel web and with said outer leg of said track member channel fore and aft of said latter web, and means to operatively engage said auxiliary frame with said first channel members at selected anchor members.

2. In a load carrying vehicle having a floor framing, a pair of longitudinally extending spaced apart parallel track members affixed to said framing on the underside thereof and each having a pair of spaced apart legs depending from a web portion to form a downturned channel, each of said track members having a longitudinally extending leg projecting above said channel into the plane of said floor framing and secured thereto, a series of longitudinally spaced anchor members secured to each of said first-mentioned members on the outer side thereof, an auxiliary frame for the running gear of said vehicle having a pair of spaced apart longitudinally extending parallel channels slidable within said framing affixed channel track members, each of said slidable channels having a horizontal leg thereof in sliding engagement with said framing affixed channel web, said slidable channel having a laterally projecting rib overlapping the outer of said track member channel legs from below, a resilient sealing strip disposed in sealing relation to and under said web for the entire length thereof and under said slidable channel leg where disposed in said first channel member to seal the same against admission of foreign substances from without, said strip making closure contact with said slidable channel and with said outer leg of said track member channel fore and aft of said slidable channel, and means to operatively engage said auxiliary framing in said first channel members at selected anchor members.

3. In a load carrying framed vehicle, a pair of longitudinally extending spaced apart track members affixed to the framing of said vehicle on the underside thereof, each of said members having a pair of spaced legs depending from a web portion to form a downturned channel, each of said track members having a longitudinally extending leg projecting above said channel into the plane of said floor framing and secured thereto, an auxiliary frame for the running gear of said vehicle having a pair of members slidable within said framing affixed channels, each of said slidable members having an outwardly laterally projecting rib underlapping the outer of said track member channel legs from below, each of said auxiliary frame members having a horizontal leg thereof in sliding engagement with said framing affixed channel web, and resilient sealing means disposed in sealing relation to and under said channel web portion for the entire length thereof and under said slidable horizontal leg where disposed in said channel to seal the same against admission of foreign substances from without, said strip making closure contact with said slidable member and with said outer leg of said track member channel fore and aft of said slidable member and inwardly thereof.

4. In a load carrying framed vehicle, a pair of longitudinally extending spaced apart track members affixed to the framing of said vehicle on the underside thereof, each of said members having a pair of spaced legs depending from a web portion to form a downturned channel, each of said track members having a longitudinally extending leg projecting above said channel into the plane of said floor framing and secured thereto, an auxiliary frame for the running gear of said vehicle having a pair of members slidable within said framing affixed channels, each of said slidable members having an outwardly laterally projecting rib underlapping the outer of said track member channel legs from below, each of said auxiliary frame members having a horizontal leg thereof in sliding engagement with said framing affixed channel web, resilient sealing means disposed in sealing relation to and under said channel web portion for the entire length thereof and under said slidable horizontal leg where disposed in said channel to seal the same against admission of foreign substances from without, said strip making closure contact with said slidable member and with said outer leg of said track member channel fore and aft of said slidable member and inwardly thereof, and a series of longitudinally spaced anchor members are secured to the outer side of each of the said first pair of members, and means operatively engage said auxiliary frame with said first-mentioned channel members at selected anchor members.

5. The structure defined in claim 4, and in which said means comprises openings in said anchor members transversely thereof, clamping means on said auxiliary frame aligned with said anchor member openings, and a pin bar disposed transversely of said auxiliary frame in said openings engageable by said clamping means to secure said auxiliary frame in a fixed position relative to said framing affixed channel members.

6. The structure defined in claim 5, and in which said clamping means is releasably engageable with said pin bar.

7. The structure defined in claim 5, and in which a pin bar is disposed at the forward end and a second pin bar is disposed at the rearward end of said auxiliary frame.

References Cited in the file of this patent

UNITED STATES PATENTS

| | | |
|---|---|---|
| 2,332,326 | Lex | Oct. 19, 1943 |
| 2,478,578 | Gottshall | Aug. 9, 1949 |
| 2,553,959 | Cook et al. | May 22, 1951 |
| 2,606,769 | De Lay | Aug. 12, 1952 |
| 2,682,419 | Wolf | June 29, 1954 |
| 2,831,735 | Bennett et al. | Apr. 22, 1958 |